Aug. 9, 1938.                R. H. ZEILMAN                2,126,597
                            SEMITRAILER CRANE
                        Filed April 29, 1937        3 Sheets-Sheet 1

INVENTOR.
ROY H. ZEILMAN
BY
His ATTORNEYS.

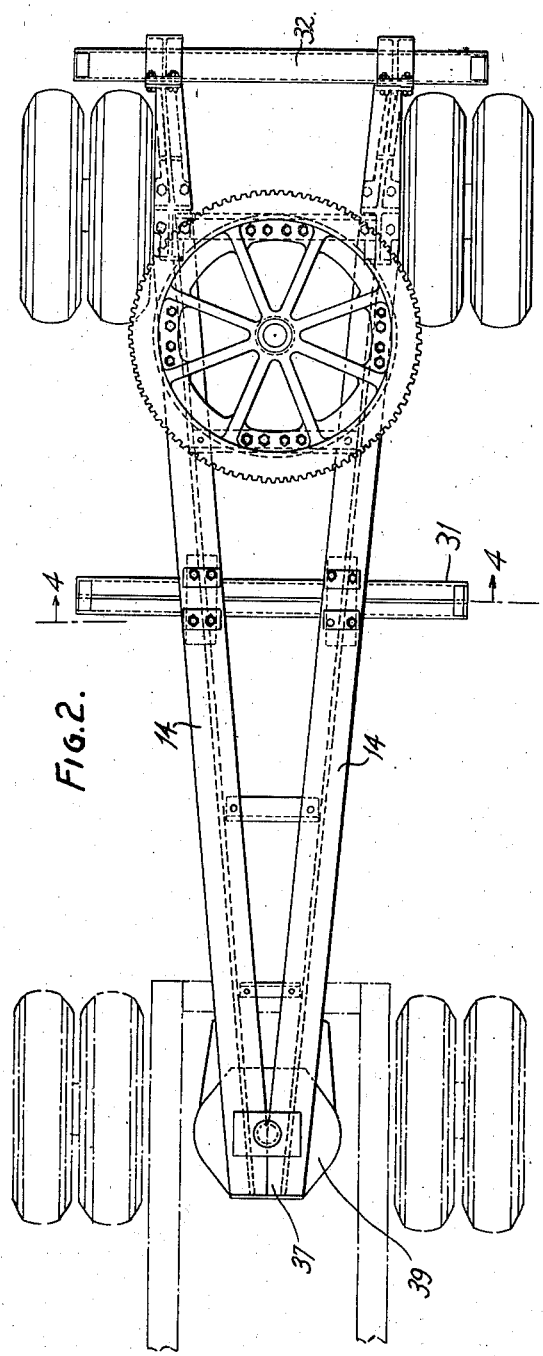
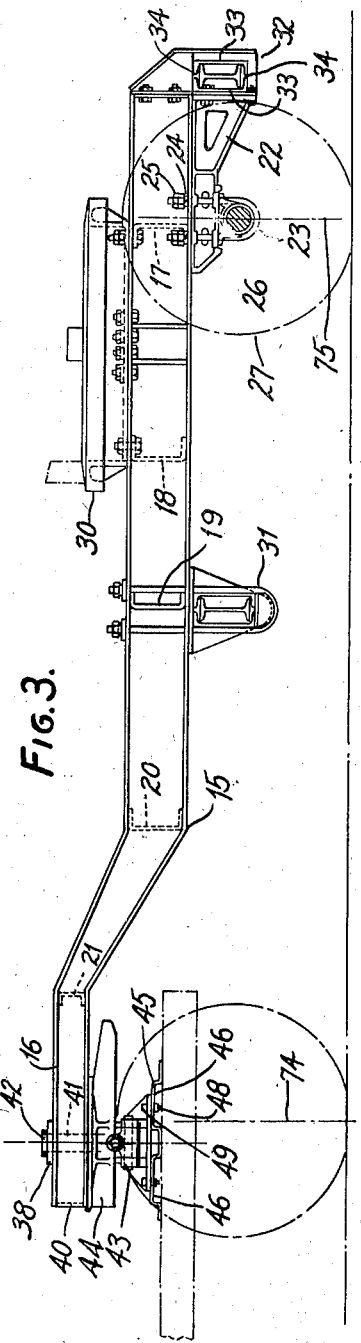

Aug. 9, 1938.  R. H. ZEILMAN  2,126,597
SEMITRAILER CRANE
Filed April 29, 1937  3 Sheets-Sheet 3
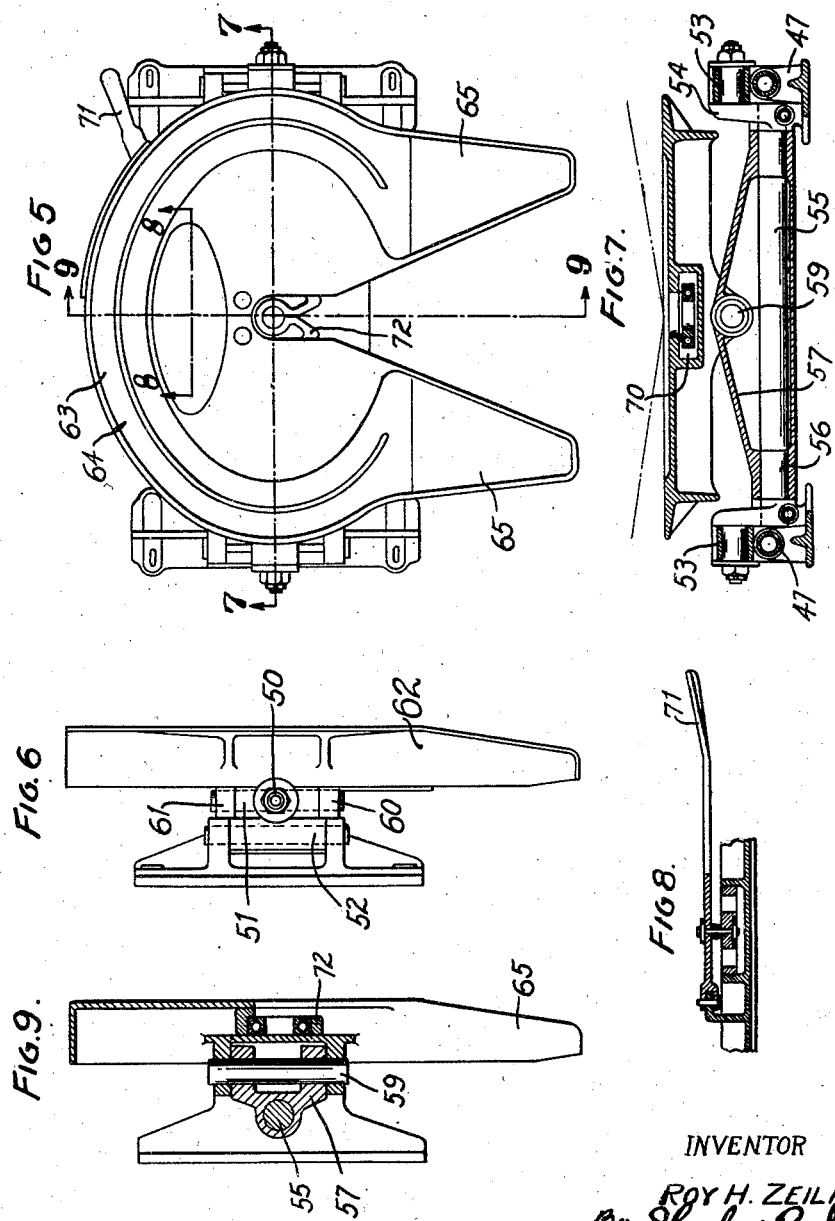
INVENTOR
ROY H. ZEILMAN
By Slough & Canfield
His ATTORNEYS Patented Aug. 9, 1938

2,126,597

UNITED STATES PATENT OFFICE 2,126,597

SEMITRAILER CRANE

Roy H. Zeilman, Lorain, Ohio, assignor to The Thew Shovel Company, Lorain, Ohio, a corporation of Ohio Application April 29, 1937, Serial No. 139,720

4 Claims. (Cl. 212—46)

This invention relates to portable load handling machines of the crane type, more particularly to a machine of this type comprising a tractor, or a motive unit and a semi-trailer crane.

Heretofore it has been common practice to transport load handling machines of the crane type from one location to another under their own power by equipping the machine with caterpillar treads or the like. However, this method is relatively slow and causes a considerable loss of time between jobs. Cranes of this type have also been mounted on a motor truck which provided sufficiently rapid transportation but presented operating difficulties. Many makes of trucks were too narrow in the track of the wheels to provide proper stability. Since truck cranes are required to lift loads equal to their own weight, truck frames do not have sufficient strength but must be reinforced at considerable expense. This reinforcing has to be applied mainly to the top of the frame, thus increasing the height of the unit. Truck springs are objectionable due to their flexibility and make the crane unstable when lifting loads over the side or back of the truck. In order to overcome this condition, it is necessary to install an arrangement to make the springs inoperative as by employing jacks and stirrups. This involves further expense, particularly so, on some types of six wheel trucks.

The increased use of light tractors and trailers in replacing heavy trucks such as are suitable for crane mounts makes it difficult to secure inexpensive used trucks on which to mount cranes. This condition requires the use of expensive new trucks and in many cases, it offsets the economy of the truck crane.

I have devised a semi-trailer mounting for cranes which overcomes the forementioned objections, both from an operating standpoint and from construction economy. Semi-trailers possess all the mobility of the truck-mounted crane, are more economical to construct, and reinforcing the truck crane and the use of axle jacks to render the springs inoperative is eliminated. Additionally, the semi-trailer is a less costly construction since only one axle with wheels, brakes and tires is required, the truck or tractor rear axle providing the other support.

I have found that the motor truck crane mount when equipped with axle jacks to eliminate rear spring action, acts with a three point support since it is impractical to provide jacks on the front axle and the front axle construction of a motor truck will not permit of concentration of loads on one wheel, as would tend to occur when working over the side. If the front truck springs were operative and the crane were working over the side, the action of the front axle is as though the support was at the longitudinal center of the axle up to a point where the crane will tip over. Thus each rear wheel is a point of support and a third point occurs at the center of the front axle and a line drawn from the center of a rear wheel to the center of the front axle is the tipping line.

I provide a fifth wheel on the truck or tractor adapted to haul the semi-trailer, the fifth wheel being mounted at the rear of the truck substantially over the rear axle and providing the third point of support for the semi-trailer. The three point mounting above described eliminates the need for springs and the resultant need for stirrups and jacks to provide a stable base for crane operation, and also eliminates the delay of placing jacks after moving.

The elimination of springs on a semi-trailer together with properly designed frame members rather than reinforced existing members, enables the height of the crane to be lowered whereby it may be operated with a minimum of overhead clearance and due to the low center of gravity, the stability is increased.

The turning radius of a truck is governed by its wheel base and since the semi-trailer is towed by a close coupled tractor, the turning radius required will be relatively small. Additionally, in transporting a truck-mounted crane the boom is normally carried over the truck cab and since the boom is hinged relatively close to the cab, it must be elevated at a high angle whereas in a semi-trailer the boom is hinged at a greater distance from the tractor cab and may be carried at a lower angle, thus reducing the overhead road clearance required.

It is an object of my invention, therefore, to provide a portable crane unit comprising a tractor and semi-trailer which can be rapidly moved from place to place.

Another object of my invention is to provide a portable crane unit comprising a tractor and semi-trailer wherein the semi-trailer frame is mounted directly on the axle eliminating the use of means to render springs inoperative.

Another object of my invention is to provide a portable crane comprising a tractor and semi-trailer having a stable base for crane operation, formed by a three-point support, two support points being the trailer wheels and the third support point being the tractor.

Another object of my invention is to provide a portable crane unit comprising a tractor and semi-trailer wherein the point of support for the crane base comprises an arrangement on a tractor insuring equal distribution of load to the tractor wheels.

Another object of my invention is to provide a crane unit comprising a tractor and semi-trailer wherein the crane base is relatively low requiring a minimum of overhead clearance for the crane.

Another object of my invention is to provide a portable crane unit which can be transported at relatively high speed and wherein the crane may be carried at a relatively low angle requiring a minimum of overhead road clearance.

Another object of my invention is to provide a portable crane unit comprising a tractor and semi-trailer which may be turned on a relatively short radius.

Another object of my invention is to provide an improved frame mounting for a semi-trailer crane unit and an improved connection between the semi-trailer and tractor.

Other objects of my invention and the invention itself will become increasingly apparent from a consideration of the following description and drawings wherein:

Fig. 2 is a plan view of the semi-trailer unit of Fig. 1 with the superstructure removed;

Fig. 3 is an elevational view of the semi-trailer truck illustrated in Fig. 2;

Fig. 5 is a plan view of a universal joint mechanism which I may employ for connecting the truck and semi-trailer of Fig. 1;

Fig. 6 is a side elevational view of a universal joint mechanism of Fig. 5;

Fig. 7 is a section taken along the line 7—7 of Fig. 5;

Fig. 8 is an inverted fragmentary sectional view taken along the line 8—8 of Fig. 5, and Fig. 9 is a sectional view taken along the line 9—9 of Fig. 5.

Figure 1:
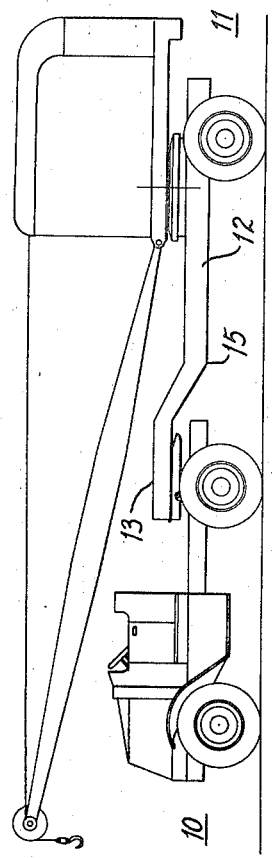
Fig. 1 is an elevational view mainly diagrammatic of a truck and a semi-trailer embodying my invention.
Figure 4:
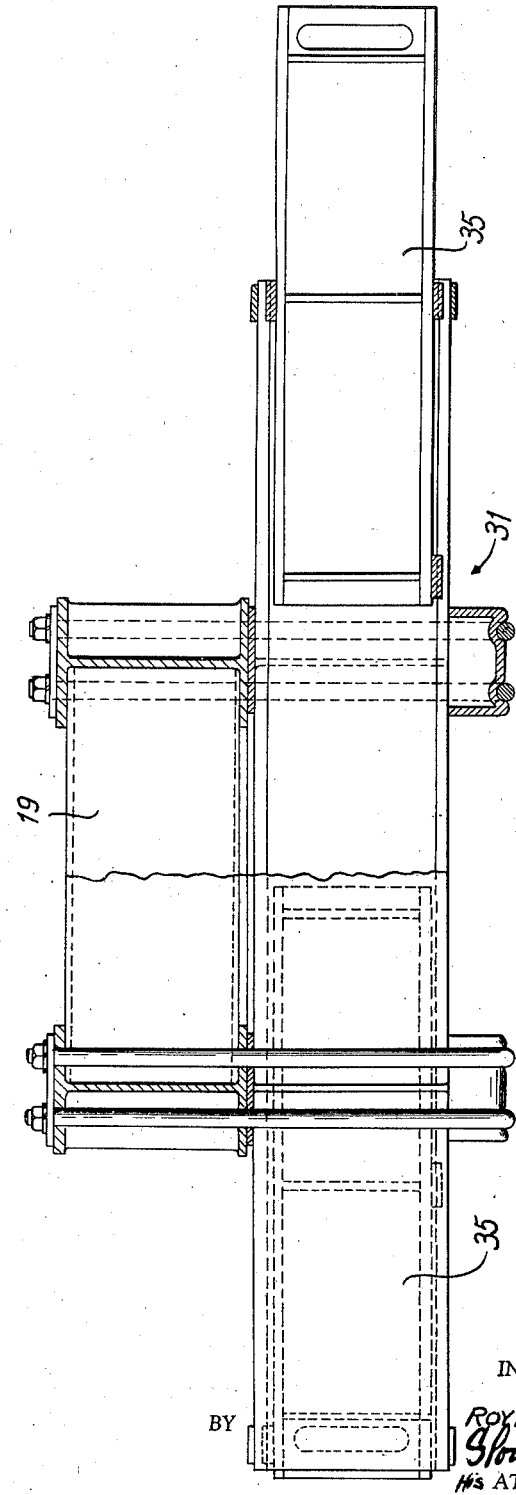
Fig. 4 is a section taken along the line 4—4 of Fig. 2.

Referring now to the drawings and particularly to Fig. 1, I have illustrated generally at 10 an automotive truck of well known construction supported by spring mounted front and rear wheels. Although for purposes of illustration, I have shown dual rear wheels, four rear wheels may be employed mounted in tandem or a single pair of rear wheels dependent on load conditions. The truck 10 is of the type adapted primarily to semi-trailer operations having a relatively short wheel base and with the rear portion of the chassis formed to support an arm of the semi-trailer. The semi-trailer generally indicated at 11 comprises a supporting frame 12 including a forwardly extending arm 13 preferably supported by two sets of dual wheels equipped with pneumatic tires. However, it is understood that the wheels may be arranged in tandem or a single set of wheels may replace the dual mounting, if desired. The truck frame preferably comprises two I-beams 14—14 substantially spaced rearwardly and converging forwardly in abutting relation. The I-beams 14 are of substantially uniform thickness for a major portion of their length and are at 15 bent upwardly and progressively reduced in thickness terminating in horizontally extending portions 16 of minimum thickness. The beams 14 are rigidly interconnected at spaced points by a plurality of channel members indicated at 17, 18, 19, 20 and 21 bolted or welded to the beams.

Secured to the under side of each beam 14 are axle brackets 22 rigidly mounted by U-bolts 23, lock washers 24, and lock nuts 25. The brackets 22 are transversely aligned and suitably bushed to provide bearings for an axle 26 upon which wheels 27 are mounted. The wheels 27 are preferably equipped with pneumatic tires and the wheels may be secured to the axle in any well known manner. For convenience I have illustrated the wheels 27 as being dual mounted but the wheels may be arranged in tandem by providing two parallel axles if desired. Also a single wheel may replace each pair of dual mounted wheels but for a given load condition I prefer the dual or tandem arrangement to maintain the semi-trailer frame relatively low.

A cast metal base 30, upon which the turntable and superstructure is rotatable is bolted to I-beam 14 and channel members 17 and 18. The construction or manner of securing the base 30 to the semi-trailer crane constitutes no essential part of my invention and any suitable construction may be employed.

I also preferably employ frontward and rear outriggers indicated at 31 and 32 respectively and of generally similar construction, the outriggers each comprising a pair of channel members 33—33 confrontingly disposed and having top and bottom plates 34 weldingly secured to the channel flanges to provide a transversely extending generally box-shaped housing. The housing thus formed is rigidly secured to the beams 14 in any suitable manner and slideably disposed therein are a pair of rails 35 of I-form cross-section and movable outwardly from the housing whereby the rail outer end may be supported by jacks or the like to provide lateral stability and support for the trailer crane.

The forward portion 16 of beams 14 preferably have the top and bottom flanges cut, as indicated at 37, to be disposed in abutting relation whereby they may be weldingly secured together and a top plate 38 generally rectangular in form is weldingly or otherwise secured to the top flanges of beams 14. A relatively large bottom bearing plate 39 is secured in a similar manner to the bottom flanges of beams 14 and the webs of the beams are preferably interconnected by an end plate 40 weldingly secured thereto. Aligned perforations are provided in plates 38 and 39 and also the top and bottom flanges of beams 14 whereby a king-pin 41 having an enlarged head 42 and a reduced neck portion 43 may be projected therethrough, the neck portion 43 extending below the bearing plate 39.

The king pin 41 is adapted to connect the semi-trailer with a fifth wheel mechanism generally indicated at 44 mounted on truck 10. The fifth wheel mechanism 44, as will be hereinafter described, permits movement about a longitudinal axis relative to the tractor and insures that the load transmitted to the tractor through the semi-trailer frame, will be equally distributed to the tractor wheels. Rigidly secured to the tractor chassis is a support element 45 preferably formed of plate material bent to provide upstanding bearing portions 46—46. A pair of transversely spaced brackets 47 are detachably secured to the support element 45 by bolts 48 and nuts 49. The brackets 47 each comprise upstanding arms 50—50 adapted to receive shafts 51 upon which are mounted trunnions 52. Trunnions 52 are each provided with bearing portions 53 to rotatably support upstanding crank arms 54 of a transversely extending shaft 55.

The shaft 55 is provided with bearing portions 56 adjacent each of the crank arms, forming a rotatable mounting for an element 57 having an upwardly extending central portion which is provided with a transverse bore 59. A shaft 60 is disposed within the bore 59 of element 57 with the shaft ends extended outwardly from the bore to engage spaced perforated portions 61—61 provided on the under side of a bearing wheel 62 or a fifth wheel. The wheel 62 comprises a plate portion 63 of generally arcuate form and including a slightly raised peripheral portion 64 having spaced guide arms 65—65 formed integrally therewith. The wheel 62 is perforated intermediate arms 65 for the reception of king-pin 41 which is projected therein to engage a thrust bearing 70, the king pin being locked in position by manipulating a lever 71, having a recess therein engageable with the neck portion 43 of the king pin.

The usual practice is to dispose the king pin 41 in the arm 13 of the semi-trailer to act as a guide in forming the connection between the tractor and semi-trailer, to spread a resilient collar 72 whereby the king pin may engage the thrust bearing 70 and be locked by manipulation of lever 71. Although I preferably employ the fifth wheel arrangement described, any suitable mechanism affording a universal connection between the tractor and semi-trailer may be used.

It will be noted that the supporting frame for the semi-trailer is of generally triangular form to substantially coincide with the tipping line between the semi-trailer rear wheels and the third point of support on the tractor whereby the semi-trailer frame is subjected to relatively little twisting action.

The arrangement described provides a rugged semi-trailer frame adapted to have considerable lateral support under operating conditions and if necessary, the outriggers may be employed and during travel or movement of the semi-trailer at the scene of operation, relative tipping movement of the tractor and semi-trailer is compensated for without transmitting an over-turning action therebetween.

It will be noted that the vertical center line of the truck rear wheels indicated at 74, is disposed slightly rearwardly of the axis of king pin 41 whereby any tendency to disengage the king pin from the universal joint mechanism or fifth wheel under load is minimized. The distance between the rear axle of the tractor indicated at 74 and the axle of the semi-trailer indicated at 75, may vary from 150 to 225 inches and the wheel base of the truck or tractor may vary from 84 inches to 115 inches. In the event that a pair of rear axles are used on either the truck or semi-trailer, the distances above referred to, are taken from the center of load on a pair of axles or from a point half way between the pair of axles.

In locating the crane on a semi-trailer, it is desirable that the center of gravity of the crane unit falls ahead of the semi-trailer axle when the boom is traveling or in forward position. This is due to the necessity of providing sufficient weight on the tractor or truck axle for traction. However, it is desirable to keep the center of the crane as far rearwardly toward the base of the triangle of the semi-trailer as possible to produce the maximum lifting capacity over the side when operating the crane. This limitation brings the axis of rotation of the crane from 21 to 30 inches ahead of the semi-trailer axle.

Although I have shown and described a preferred embodiment of my invention, I contemplate that numerous and extensive departures may be made therefrom without departing from the spirit of my invention and the scope of the appended claims.

Having thus described my invention, what I claim is:

1. A portable crane unit comprising a tractor and a semi-trailer having a rotatable crane mounted thereon, the semi-trailer frame being generally triangular in form and supported at the rear thereof by transversely spaced wheels rigidly secured to the frame, the forward portion of the semi-trailer frame being supported by the tractor, the frame being connected to the tractor by a bearing wheel disposed substantially above the rear axle of the tractor, said bearing wheel being rotatable about a vertical axis and a longitudinally extending horizontal axis, and a king pin projected through the forward portion of the frame and detachably engaging the bearing wheel.

2. A supporting frame for a load handling machine of the semi-trailer type adapted to be hauled by a tractor, the frame comprising a plurality of longitudinally extending beams spaced rearwardly and converging forwardly, a plurality of transverse members rigidly interconnecting the beams, an axle rigidly secured to the rear of the frame, a base rigidly supported by the beams forwardly of and adjacent the axle adapted to have a superstructure rotated thereupon, a bearing plate secured to forward portions of the beams adapted to transmit load to a universal joint mechanism mounted on the tractor, a king pin projected through the forward portion of the beams and the bearing plate adapted to engage the universal joint mechanism, and transversely extending outriggers rigidly secured to the beams at longitudinally spaced points comprising beams slideable laterally of the frame and adapted to engage a jack or the like at their outer ends.

3. A portable crane unit comprising a tractor and a semi-trailer having a rotatable crane mounted thereon, the semi-trailer frame being generally triangular in form diverging rearwardly and supported at the rear thereof by transversely spaced wheels rigidly secured to the frame, the forward portion of the trailer frame being supported by the tractor, the frame being connected to the tractor by a bearing wheel disposed substantially above the rear axle of the tractor, said bearing wheel being rotatable about a vertical axis and a longitudinal extending horizontal axis, and a king pin projected through the forward portion of the frame and detachably engaging the bearing wheel forwardly of the tractor rear axle, and laterally extending outriggers rigidly secured to the frame disposed both forwardly and rearwardly of the axis of rotation of the crane.

4. A supporting frame for a load handling machine of the semi-trailer type adapted to be hauled by a tractor, the frame comprising a plurality of longitudinally extending beams spaced rearwardly and converging forwardly, a plurality of transverse members rigidly interconnecting the beam, an axle rigidly secured to the rear of the frame, a base rigidly supported by the beam forwardly of and adjacent the axle adapted to have a superstructure rotated thereupon, the distance between the axle and the axis of rotation of the superstructure being 21 inches to 30 inches, a bearing plate secured to forward portions of the beams adapted to transmit load to a universal joint mechanism mounted on the tractor, a king pin projected through the forward portion of the beams and the bearing plate adapted to engage the universal joint mechanism, transversely extending outriggers rigidly secured to the beam both forwardly and rearwardly of the base, and said outriggers comprising beams slideable laterally of the frame and adapted to engage jacks or the like at their outer ends.

ROY H. ZEILMAN.